United States Patent
Shin et al.

(10) Patent No.: US 12,488,252 B2
(45) Date of Patent: Dec. 2, 2025

(54) METHOD AND APPARATUS FOR PREDICTING A VEHICLE COLLISION WITH A SURROUNDING OBJECT

(71) Applicants: HYUNDAI MOTOR COMPANY, Seoul (KR); KIA CORPORATION, Seoul (KR); AJOU UNIVERSITY INDUSTRY-ACADEMIC COOPERATION FOUNDATION, Suwon-si (KR)

(72) Inventors: Jang-Ho Shin, Yongin-si (KR); Bong-Sob Song, Suwon-si (KR); Sung-Woo Lee, Suwon-si (KR)

(73) Assignees: HYUNDAI MOTOR COMPANY, Seoul (KR); KIA CORPORATION, Seoul (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 253 days.

(21) Appl. No.: 18/203,425

(22) Filed: May 30, 2023

(65) Prior Publication Data
US 2024/0177014 A1    May 30, 2024

(30) Foreign Application Priority Data
Nov. 24, 2022  (KR) .......................... 10-2022-0159050

(51) Int. Cl.
*G06N 3/091* (2023.01)
*G06N 3/0464* (2023.01)
(Continued)

(52) U.S. Cl.
CPC ........... *G06N 3/091* (2023.01); *G06N 3/0464* (2023.01); *G06T 7/70* (2017.01); *G06T 11/001* (2013.01);
(Continued)

(58) Field of Classification Search
None
See application file for complete search history.

(56) References Cited

U.S. PATENT DOCUMENTS 10,940,857 B2    3/2021  Lee et al.
11,338,751 B2    5/2022  Mase et al.
(Continued)

FOREIGN PATENT DOCUMENTS

| KR | 20180066495 A | 6/2018 |
| KR | 20180087843 A | 8/2018 |
| KR | 20180115444 A | 10/2018 |

OTHER PUBLICATIONS

Fang, Xiaowen, et al., A Double-threshold-testing Robust Method for Fault Detection and Isolation in Dynamic Systems, Proceedings of 1994 American Control Conference—ACC; vol. 2; IEEE, 1994; pp. 1979-1983.
(Continued)

*Primary Examiner* — Todd Melton
(74) *Attorney, Agent, or Firm* — Lempia Summerfield Katz LLC

(57) ABSTRACT

An apparatus for predicting a collision of a vehicle with a surrounding object around the vehicle includes: a surrounding object information detection unit configured to obtain current state information on the object; a lane detection unit configured to obtain information on a lane on which the vehicle travels; a risk level determination unit configured to calculate a collision risk level between the object and the vehicle using state information on the object; a surrounding environment prediction unit configured to predict future state information on the object using an estimation algorithm or a deep learning algorithm; an information integration unit configured to integrate the current state information, the lane information, the collision risk level, and the future state information to generate a simplified bird's eye view; and a
(Continued)

collision mode determination unit configured to predict collision modes by using the simplified bird's eye view.

17 Claims, 13 Drawing Sheets

(51) Int. Cl.
 G06T 7/70 (2017.01)
 G06T 11/00 (2006.01)
 G06T 11/20 (2006.01)
 G06V 10/80 (2022.01)
 G06V 20/56 (2022.01)
 G06V 20/58 (2022.01)

(52) U.S. Cl.
 CPC .......... *G06T 11/203* (2013.01); *G06V 10/803* (2022.01); *G06V 20/58* (2022.01); *G06V 20/588* (2022.01); *G06T 2207/30241* (2013.01)

(56) References Cited

U.S. PATENT DOCUMENTS

| | | | |
|---|---|---|---|
| 11,691,648 B2* | 7/2023 | Theverapperuma | G06V 10/454 701/25 |
| 11,858,529 B1* | 1/2024 | Costantino | B60W 40/02 |
| 2018/0162393 A1 | 6/2018 | Lee et al. | |
| 2018/0208141 A1 | 7/2018 | Mase et al. | |
| 2023/0339502 A1* | 10/2023 | Chi-Johnston | G06N 20/00 |

OTHER PUBLICATIONS

Shah, Nitesh R., et al., Comparison of Motor Vehicle-involved E-scooter and Bicycle Crashes Using Standardized Crash Typology, Journal of Safety Research, vol. 77; 2021; pp. 217-228.

* cited by examiner

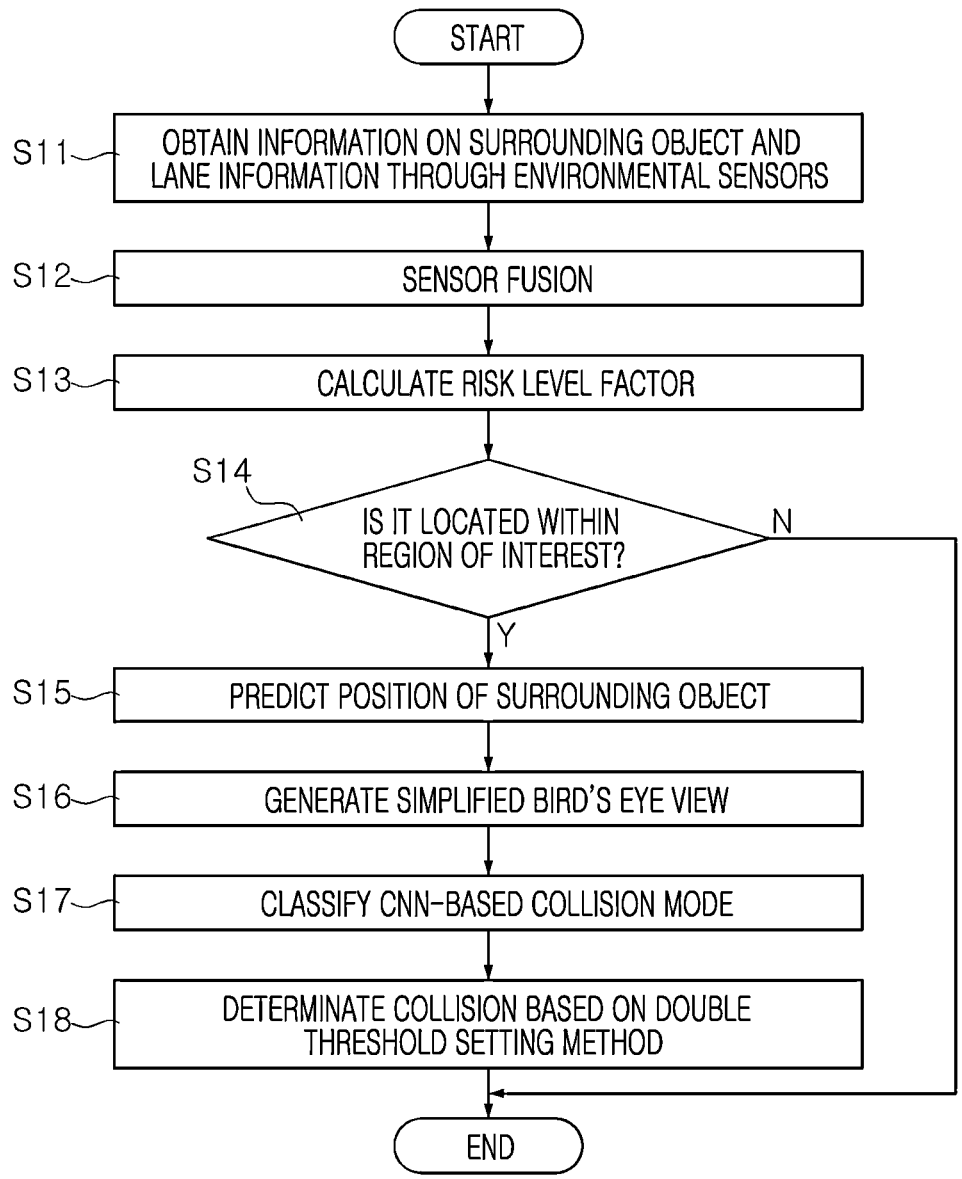

METHOD AND APPARATUS FOR PREDICTING A VEHICLE COLLISION WITH A SURROUNDING OBJECT

CROSS-REFERENCE TO RELATED APPLICATION

This application claims priority to Korean Patent Application No. 10-2022-0159050, filed on Nov. 24, 2022, which is incorporated herein by reference in its entirety.

BACKGROUND OF THE DISCLOSURE

Technical Field

The present disclosure relates to a method and apparatus for predicting a likelihood of a collision with a surrounding object around a traveling vehicle and predicting a collision site.

Description of Related Art

In a vehicle, safety against risks is considered important in addition to convenience. In this respect, vehicles have been equipped with various types of sensors for safety. In particular, studies on advanced driver assistance systems (ADAS) are actively being carried out for the driving convenience of users. Further, autonomous vehicles are being actively developed.

Specifically, studies have been conducted on technologies for detecting the risk of collision of a vehicle using peripheral sensors of the vehicle and predicting the risk of collision while the vehicle travels.

There are technologies that predict whether there will be a collision and distinguish or predict collision sites of an ego vehicle, i.e., the driving vehicle with the sensors, in an imminent collision situation on the basis of state information on and a risk level of a surrounding vehicle obtained by the conventional sensors. However, technologies have not yet been developed for predicting a likelihood of a collision with a moving pedestrian, particularly a vulnerable road user, or predicting the collision site of the ego vehicle.

The above information disclosed in the related art section is only to enhance understanding of the background of the present disclosure. Therefore, the related art section may contain information that does not form the related art that is already known to a person of ordinary skill in the art.

SUMMARY OF THE DISCLOSURE

The present disclosure has been made to solve the above-described problems. An object of the present disclosure is to provide a method and apparatus for predicting a likelihood of a collision with a moving pedestrian, particularly a vulnerable road user, and predicting a collision site of an ego vehicle.

One aspect of the present disclosure provides an apparatus for predicting a collision with a surrounding object around a vehicle. The apparatus is embedded in a vehicle and predicts a collision with an object moving around the vehicle while traveling. The apparatus includes a surrounding object information detection unit configured to obtain current state information on the object by a sensor equipped on the vehicle. The apparatus also includes a lane detection unit configured to obtain information on a lane on which the vehicle travels by a camera equipped on the vehicle. The apparatus also includes a risk level determination unit configured to calculate a collision risk level between the object and the vehicle using state information on the object received from the surrounding object information detection unit. The apparatus also includes a surrounding environment prediction unit configured to predict future state information on the object using an estimation algorithm or a deep learning algorithm. The apparatus also includes an information integration unit configured to integrate the current state information, the lane information, the collision risk level, and the future state information to generate a simplified bird's eye view. The apparatus also includes a collision mode determination unit configured to predict collision modes through a convolutional neural network (CNN) using the simplified bird's eye view as an input.

In this case, the surrounding object information detection unit may fuse information obtained from the sensor equipped on the vehicle to obtain the current state information.

Further, the risk level determination unit may calculate the collision risk level when the object is located within a region of interest using the current state information.

In addition, the information integration unit may express the current state information, the future state information, the lane information, and the collision risk level as a combination of lines and polygons having a plurality of colors to generate the simplified bird's eye view.

Further, the information integration unit may express an actual past trajectory of the object and a future trajectory of the object on the basis of the present trajectory or position, i.e., current status information of the object to generate the simplified bird's eye view.

In addition, the collision mode determination unit may predict the collision modes by learning virtual traveling data obtained by simulating a collision accident between the vehicle and the object in consideration of a motion type of the vehicle, a motion type of the object, and a road environment.

In this case, the virtual traveling data may be data obtained by performing a simulation for each type of object.

In addition, the collision mode determination unit may classify the collision modes on the basis of whether there will be a collision between the vehicle and the object and on the basis of a collision site of the vehicle.

Further, the collision mode determination unit may calculate a probability of a result of classifying the collision modes and may output a final collision mode determination result when the calculated probability exceeds a threshold value.

Another aspect of the present disclosure provides a method of predicting a collision between a vehicle and a surrounding object moving around the vehicle while traveling. The method includes obtaining, by a surrounding object information detection unit, current state information on the object using a sensor equipped on the vehicle and obtaining, by a lane detection unit, information on lane on which the vehicle travels. The method also includes calculating, by a risk level determination unit, a collision risk level between the object and the vehicle by using state information on the object. The method also includes predicting, by a surrounding environment prediction unit, future state information on the object by using an estimation algorithm or a deep learning algorithm. The method also includes generating, by an information integration unit, a simplified bird's eye view by integrating the current state information, the lane information, the collision risk level, and the future state information. The method also includes predicting collision modes through a convolutional neural network (CNN) using the simplified bird's eye view as an input. The method also includes calculating a probability of a result of classifying the collision modes by the predicting of the collision modes and outputting a final collision mode determination result when the calculated probability exceeds a threshold value. The predicting of the collision modes includes extracting a collision prediction feature through a convolutional layer and a pooling layer and classifying the collision modes through a fully connected layer.

In addition, the method may further include fusing information obtained from multiple sensors equipped on the vehicle before the calculating of the collision risk level.

Further, the method may further include determining whether the object is located within a region of interest using the current state information after calculating the collision risk level. Predicting the future state information may be performed when the object is located within the region of interest.

In addition, generating the simplified bird's eye view may include doing so by expressing the current state information, the future state information, the lane information, and the collision risk level as a combination of lines and polygons having a plurality of colors.

In addition, generating the simplified bird's eye view may include doing so by expressing a past trajectory of the object and a future trajectory of the object on the basis of the present trajectory, position, or current status information of the object.

In addition, predicting the collision modes may include doing so by learning virtual traveling data obtained by simulating a collision accident between the vehicle and the object in consideration of a motion type of the vehicle, a motion type of the object, and a road environment.

Further, the virtual traveling data may be data obtained by performing a simulation for each type of object.

In addition, predicting the collision modes may include classifying the collision modes on the basis of whether there will be a collision between the vehicle and the object and on the basis of a collision site of the vehicle.

According to the present disclosure, it is possible to predict a site in which a vulnerable road user will collide with an ego vehicle when a collision with the vulnerable road user is predicted by using the CNN technique.

According to the method of the present disclosure, it is possible to determine when to switch control authority from an autonomous driving system to an integrated safety system in a dangerous situation where a collision is expected to occur. It is also possible to establish a more sophisticated collision avoidance strategy before the actual collision occurs and to minimize the risk level through a cooperate control with a collision avoidance system even though the collision occurs.

In addition, it is possible to actively control deployment timing of a safety system such as a pedestrian airbag or a hood lift in advance on the basis of the predicted collision site, thereby minimizing injuries to vulnerable road users and passengers in more various collision situations.

BRIEF DESCRIPTION OF THE DRAWINGS

FIG. 17 is a flowchart illustrating a method of predicting a collision with a surrounding object around a vehicle according to the present disclosure.

DESCRIPTION OF SPECIFIC EMBODIMENTS

Hereinafter, embodiments of the present disclosure are described in detail with reference to the accompanying drawings. Since these embodiments, as examples, may be implemented in various different forms by those of ordinary skill in the art to which the present disclosure pertains, the present disclosure is not limited to the embodiments described herein.

In order to sufficiently understand the present disclosure, advantages in operation of the concepts of the present disclosure, and the objects to be achieved by carrying out the present disclosure, reference should be made to the accompanying drawings for illustrating embodiments of the present disclosure and contents disclosed in the accompanying drawings.

Further, in the description of the present disclosure, the repetitive descriptions of publicly-known related technologies have been reduced or omitted where it is determined that the descriptions may unnecessarily obscure the subject matter of the present disclosure. When a component, device, element, unit, or the like of the present disclosure is described as having a purpose or performing an operation, function, or the like, the component, device, element, or unit should be considered herein as being "configured to" meet that purpose or perform that operation or function.

Figure 1:
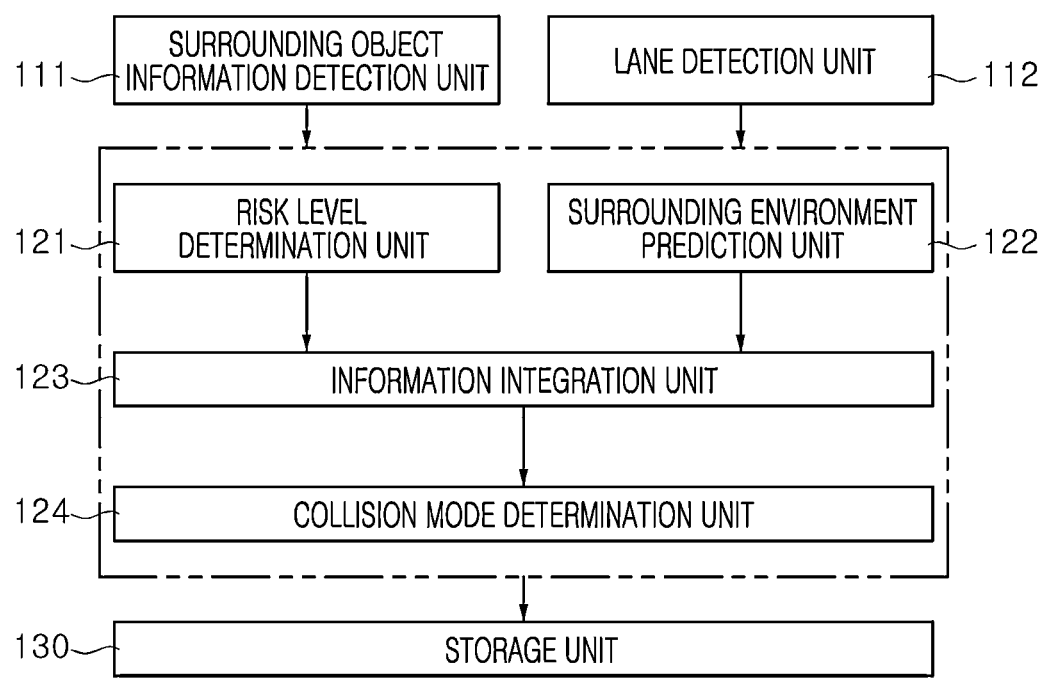
FIG. 1 is a block diagram illustrating an apparatus for predicting a collision with a surrounding object around a vehicle according to the present disclosure.

FIG. 1 is a block diagram illustrating an apparatus for predicting a collision with a surrounding object around a vehicle according to the present disclosure.

Hereinafter, the apparatus for predicting a collision with a surrounding object around a vehicle according to an embodiment of the present disclosure is described with reference to FIG. 1.

Unlike the related art, a method and apparatus for predicting a collision according to the present disclosure predict whether a collision will occur between a vehicle of interest, i.e., an ego vehicle, and a surrounding moving object such as a pedestrian and predict a collision site of an ego vehicle.

To this end, the apparatus for predicting a collision according to the present disclosure includes a surrounding object information detection unit 111, a lane detection unit 112, a risk level determination unit 121, a surrounding environment prediction unit 122, an information integration unit 123, a collision mode determination unit 124, and a storage unit 130.

The surrounding object information detection unit 111 obtains state information (positions, velocities, acceleration, heading angles, widths, lengths, etc.) on a surrounding object such as a vulnerable road user and the like detected by merging data, i.e., fusing multiple sensors such as a camera, a radar, or light detection and ranging (LiDAR) equipped on the vehicle.

The lane detection unit 112 obtains lane information (a distance to a lane, a road slope, a curvature, etc.) in front of the vehicle, i.e., the ego vehicle, on the basis of a camera sensor to predict a collision in consideration of the curvature of the lane.

The risk level determination unit 121 calculates a collision risk level with an ego vehicle through the state information on the surrounding object received from the surrounding object information detection unit 111.

The surrounding environment prediction unit 122 predicts state information such as a future position and velocity of the surrounding object using an estimation algorithm (e.g., a Kalman filter) or a deep learning algorithm (e.g., a long short-term memory (LSTM)).

Next, the information integration unit 123 integrates the calculation and prediction results of the surrounding object information detection unit 111, the lane detection unit 112, the risk level determination unit 121, and the surrounding environment prediction unit 122 to generate a simplified bird's eye view expressed in Red Green Blue (RGB) color.

The collision mode determination unit 124 predicts collision modes through a convolutional neural network (CNN) using the generated simplified bird's eye view as input.

The collision mode represents whether a collision will occur with a corresponding surrounding object and represents a predicted collision site in case of a collision.

The storage unit 130 may store software and various setting information programmed to operate the described collision mode determination system and may temporarily store data generated by the system during operation.

The present disclosure uses deep learning to predict whether a collision will occur and to predict a collision site. To this end, data to be used for learning by the collision mode determination unit 124 is required. In general, maneuver determination studies or trajectory prediction studies, such as a determination on whether surrounding vehicles may intervene, are performed on the basis of a safe scenario in which an accident does not occur. Accident occurrence data are required to predict the collision modes, but it is difficult to obtain the accident occurrence data through an experiment in which an actual vehicle collides with a vulnerable road user. Therefore, virtual traveling data are generated for use by performing simulations.

A scenario including a motion of an ego vehicle (lane keeping, left/right turn, etc.), a motion of a vulnerable road user (crossing, stop, walking along the road, oncoming, etc.), the road environment, and the like is required in order to generate virtual vulnerable road user moving data. The scenario may be selected using traffic accident data and references.

In other words, accident data on traffic accidents are used to select pedestrian and bicycle scenarios.

In addition, literature on traffic accident analysis (report on vehicle-based functional tests, PROSPECT, 2018, Shah, Nitesh R., et al. "Comparison of Motor Vehicle-involved E-scooter and Bicycle Crashes Using Standardized Crash Typology," Journal of Safety Research (2021).) may be used to select bicycle and e-scooter scenarios.

Figure 2:
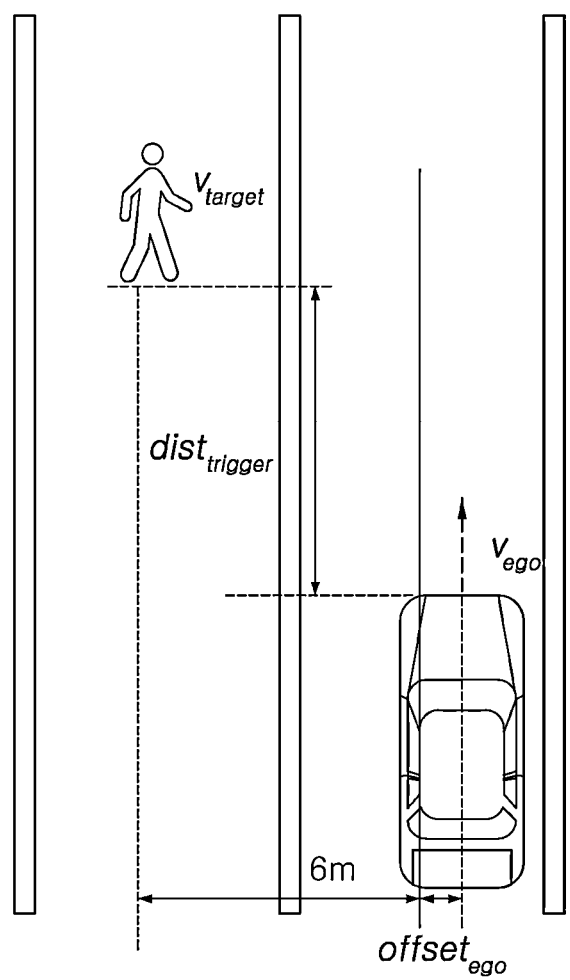
FIG. 2 is a view for explaining generation of learning data of the present disclosure.

The above basic scenarios for learning are described in more detail with reference to FIG. 2. FIG. 2 is an example of a basic scenario in which an ego vehicle goes straight on a straight road and a pedestrian crosses from left to right. The corresponding basic scenario includes parameters such as a velocity of the ego vehicle ($V_{ego}$), a velocity of the object ($V_{target}$), a horizontal position of the ego vehicle ($offset_{ego}$), and a distance to the ego vehicle at a point in time when the pedestrian starts to cross the road ($Dist_{trigger}$). Simulation is performing by linearly sampling each parameter to generate one detailed scenario.

As described above, multiple detailed scenarios may be generated from one basic scenario by performing the simulation with the entire combination of respective parameter ranges.

Figure 3:
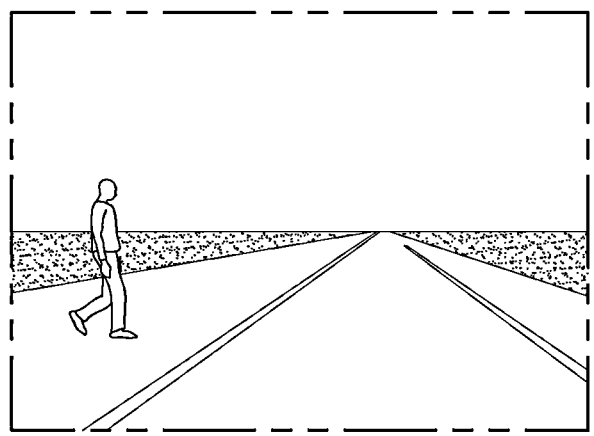
FIG. 3 is a view illustrating a scene in which a pedestrian crosses a road.
Figure 4:
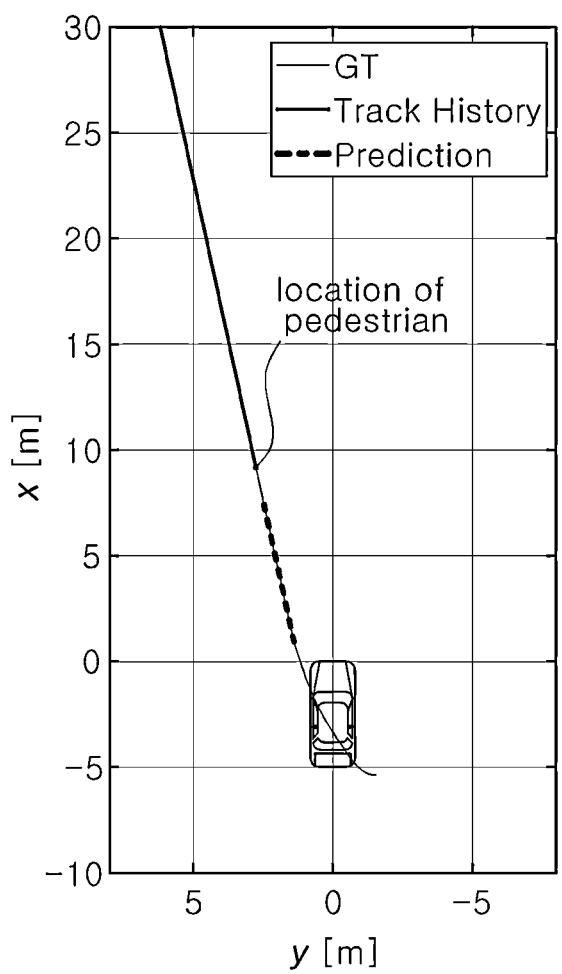
FIG. 4 is a view illustrating an example of predicting a position of the pedestrian according to the present disclosure in the situation illustrated in FIG. 3.

FIG. 3 is a view illustrating a scene in which a pedestrian crosses a road. FIG. 4 is a view illustrating an example of predicting a position of the pedestrian according to the present disclosure in the situation illustrated in FIG. 3.

A method of predicting the position of the pedestrian by the surrounding environment prediction unit 122 is described as an example with reference to FIGS. 3 and 4.

Examples of algorithms for prediction include estimation algorithms, such as a Kalman filter, and deep learning algorithms, such as long short-term memory (LSTM).

FIG. 4 illustrates an example of predicting the position of the pedestrian in a set time domain using the Kalman filter for the scenario in which the pedestrian crosses the road from left to right on a straight road, as illustrated in FIG. 3.

In FIG. 4, a GT line (light green on RGB) indicates a trajectory that the pedestrian actually moves, a track history line (dark green on RGB) indicates a past trajectory of the pedestrian, and a point located at about 10 meters in a vertical direction indicates a current location or position of the pedestrian. A trajectory indicated by a prediction dotted line (red dotted line on RGB) refers to a trajectory predicted by the surrounding environment prediction unit 122 at the current location of the pedestrian.

Figure 5:
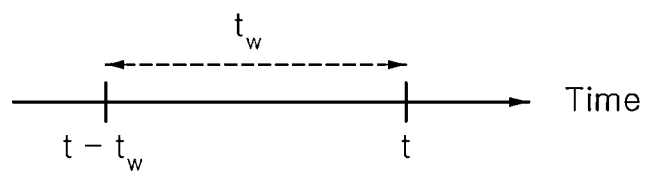
FIGS. 5 and 6 are views illustrating examples of generating a Red Green Blue (RGB) simplified bird's eye view according to the present disclosure.
Figure 6:
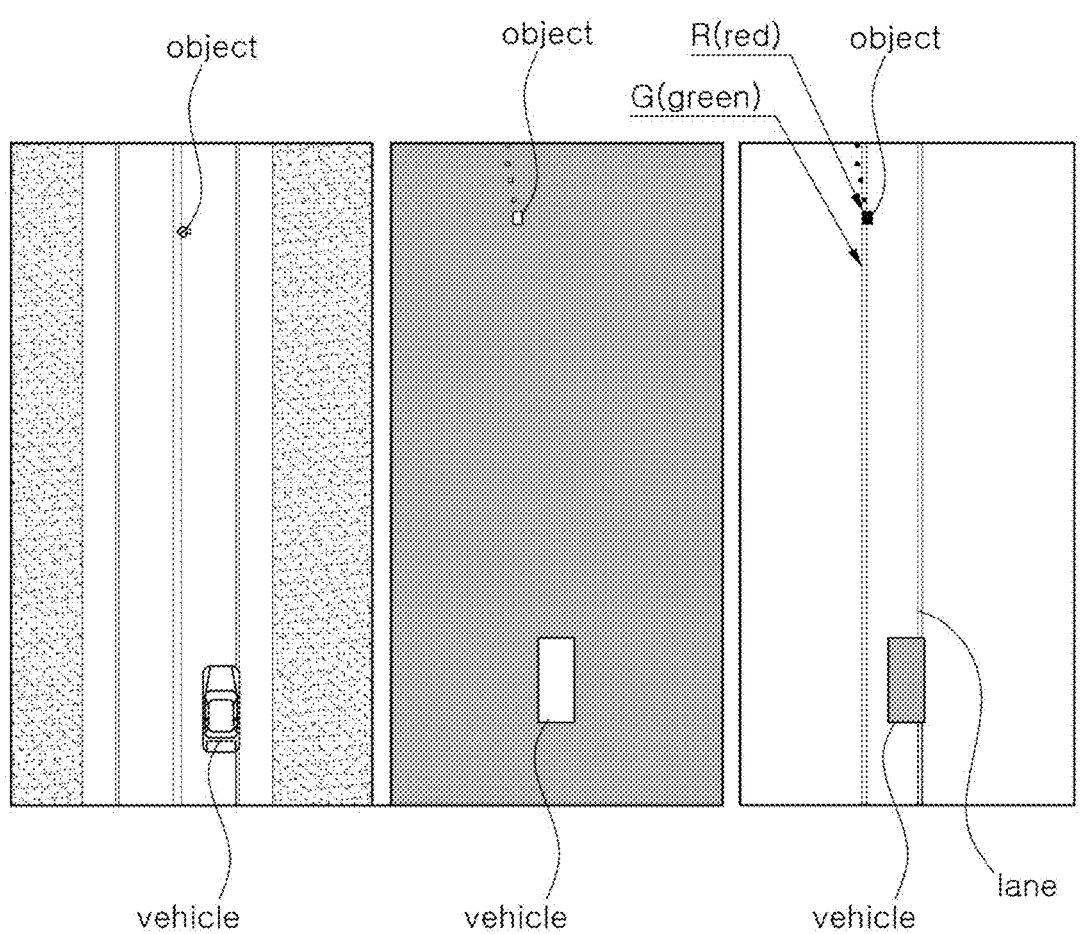

FIGS. 5 and 6 are views illustrating examples of generating an RGB simplified bird's eye view according to the present disclosure.

FIG. 5 illustrates a time domain and FIG. 6 illustrates a simplified bird's eye view (SBEV) image according to an embodiment. The information integration unit 123 integrates the calculation and prediction results of the surrounding object detection unit 111, the lane detection unit 112, the risk level determination unit 121, and the surrounding environment prediction unit 122. The information integration unit 123 also generates the RGB simplified bird's eye view in order to determine the collision mode on the basis of the CNN.

First, a method of expressing the results from the surrounding object detection unit 111, the lane detection unit 112, and the risk level determination unit 121 in the RGB simplified bird's eye view is described.

The information integration unit 123 generates the RGB simplified bird's eye view having a size of (m×n) when the surrounding object is located within a region of interest. The state information and risk level information on the surrounding object are expressed in the simplified bird's eye view for a previous time domain $t_w$ at the current point in time t, similar to the second image from the left side of FIG. 6.

In addition, lane information (a distance to a lane, a road slope, a curvature, etc.) is additionally expressed in the simplified bird's eye view to reflect a road shape. As illustrated in the third image from the left of FIG. 6, to distinguish between the surrounding object and lane, the information on the surrounding object (position, past trajectory, heading angle, width, length, etc.) may be expressed as an R (red) channel of the simplified bird's eye view, and the lane information may be expressed as a G (green) channel. The risk level of the surrounding object may be divided by the brightness of the red channel. In the RGB simplified bird's eye view, a space where an ego vehicle is capable of moving may be expressed as a white rectangle and the ego vehicle may be expressed as a black rectangle.

Figure 7:
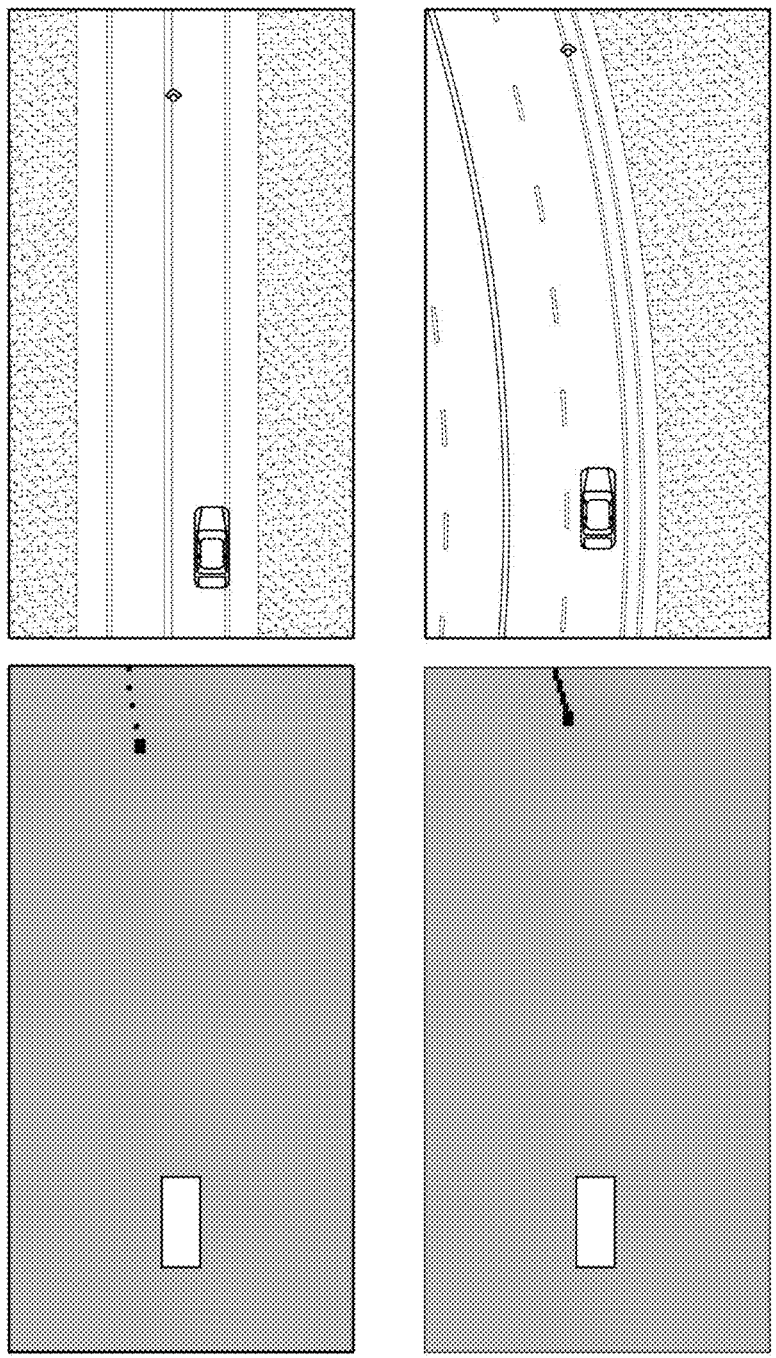
FIG. 7 is a view illustrating simplified bird's eye views according to the related art on a curved road.
Figure 8:
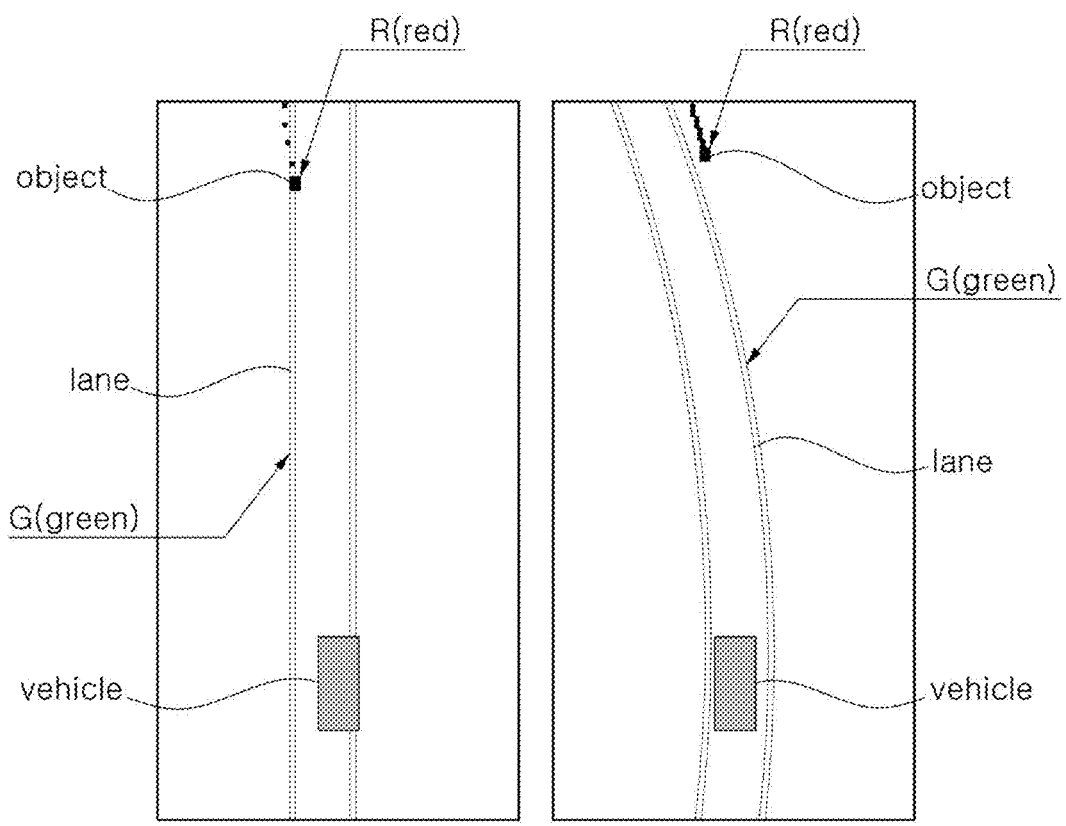
FIG. 8 is a view illustrating RGB simplified bird's eye views according to the present disclosure on a curved road.

FIG. 7 illustrates the RGB simplified bird's eye views according to the related art in a curved road. FIG. 8 illustrates the RGB simplified bird's eye views on a curved road according to the present disclosure.

In FIG. 7, the two images above are scenes for different scenarios and the two images below are examples of the simplified bird's eye view generated for each scenario.

The left scenario is an example of a scenario in which a pedestrian crosses from left to right on a straight road and collides with an ego vehicle. The right scenario is an example of a safe scenario in which a pedestrian walks along a curved road.

As illustrated in FIG. 7, for different scenarios, in the conventional simplified bird's eye view, since the pedestrian exists at a similar position in front of the ego vehicle, it may be difficult to distinguish the two scenarios only with the simplified bird's eye view.

However, as illustrated in FIG. 8, according to the present disclosure, in the left RGB simplified bird's eye view, it may be confirmed that a pedestrian, i.e., an object, crosses the lane and enters the lane of an ego vehicle. In the right RGB simplified bird's eye view, it may be confirmed that the pedestrian is located outside the lane of the ego vehicle.

Figure 9:
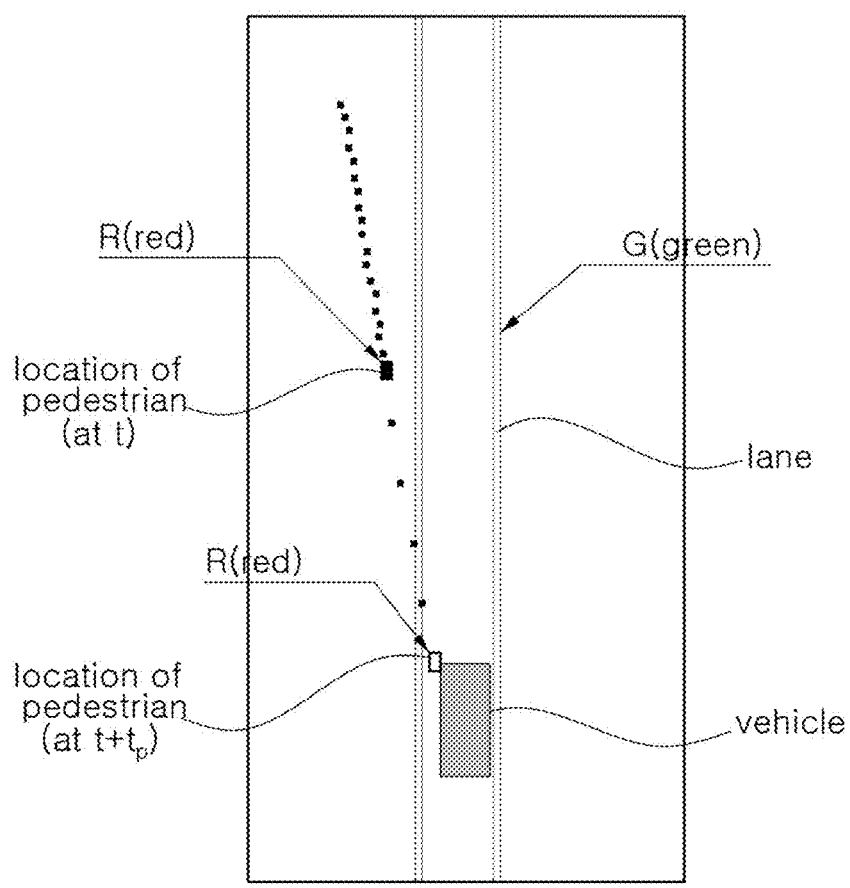
FIGS. 9 and 10 are views illustrating examples of predicting a position of a pedestrian according to the present disclosure in the situation illustrated in FIG. 3.
Figure 10:
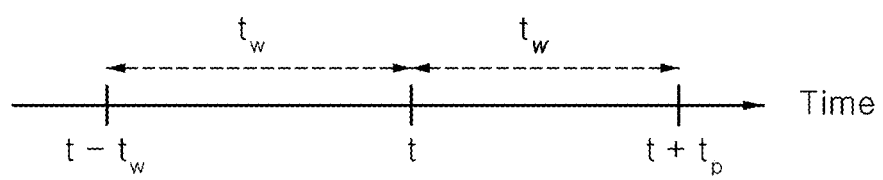

FIGS. 9 and 10 illustrate examples of predicting a position of a pedestrian according to the present disclosure in the situation illustrated in FIG. 3. These examples are generated by integrating the prediction result of the surrounding environment prediction unit 122 into the RGB simplified bird's eye view in which the calculation and prediction results of the surrounding object detection unit 111, the lane detection unit 112, and the risk level determination unit 121 are reflected.

The result of the surrounding environment prediction unit 122 is reflected in the RGB simplified bird's eye view and is used as an input of a deep learning network in order to determine the collision mode at an earlier point in time.

FIG. 9 illustrates the same scenario as FIG. 3 and a result of reflecting the result of the surrounding environment prediction unit 122 into the RGB simplified bird's eye view. A surface-filled rectangle represents a position of a pedestrian at the present point in time, and a trajectory upwardly drawn from the corresponding rectangle represents a past position of the pedestrian. Here, when a length of the time domain for prediction is $t_p$, a predicted position for a point in time before $t \sim t+t_p$ is expressed as a trajectory. Also, a position of the pedestrian predicted for a point in time $t+t_p$ is expressed as a square whose surface is not filled with respect to a size of the surrounding object. Further, the result of the risk level determination unit 121 calculated at the present point in time may be expressed as the brightness of the R (red) channel for the predicted position.

Figure 11:
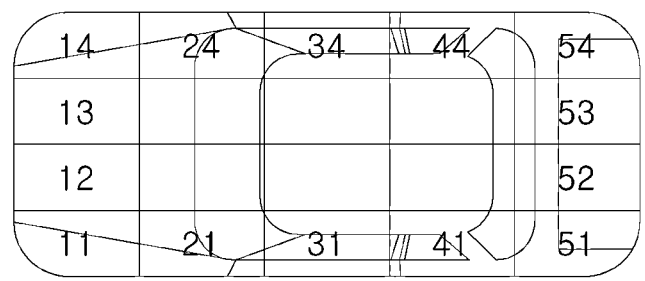
FIG. 11 is a view illustrating vehicle sites.
Figure 12:
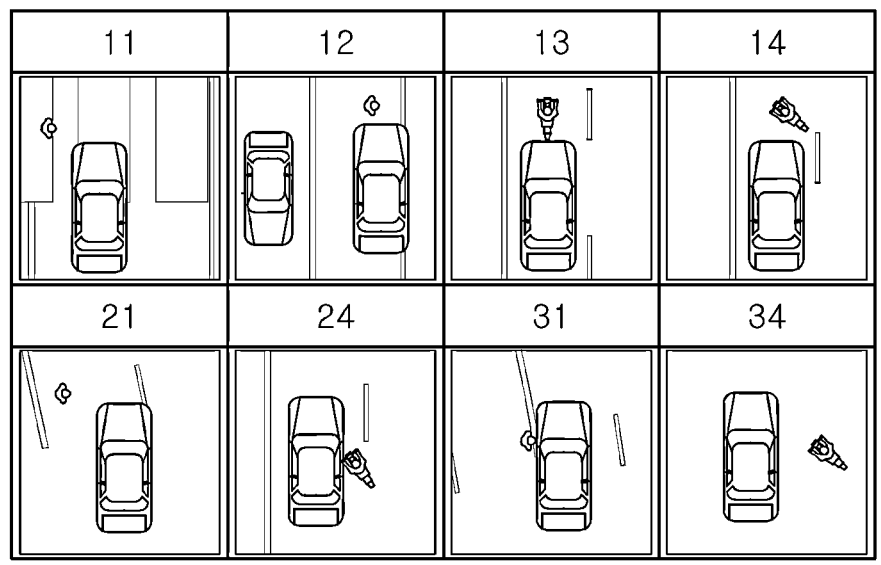
FIG. 12 is a view illustrating examples of collision modes.
Figure 13:
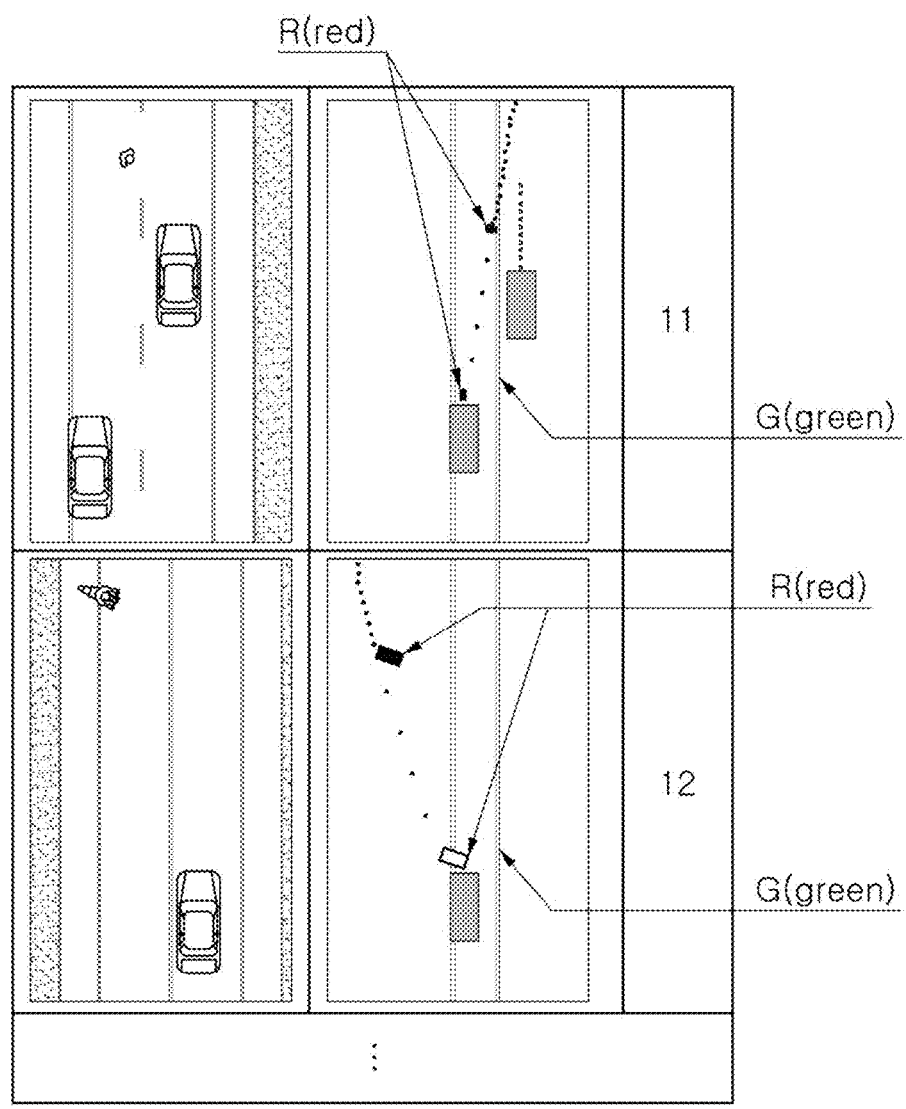
FIGS. 13-16 are views sequentially illustrating a collision mode determination process according to the present disclosure.
Figure 14:
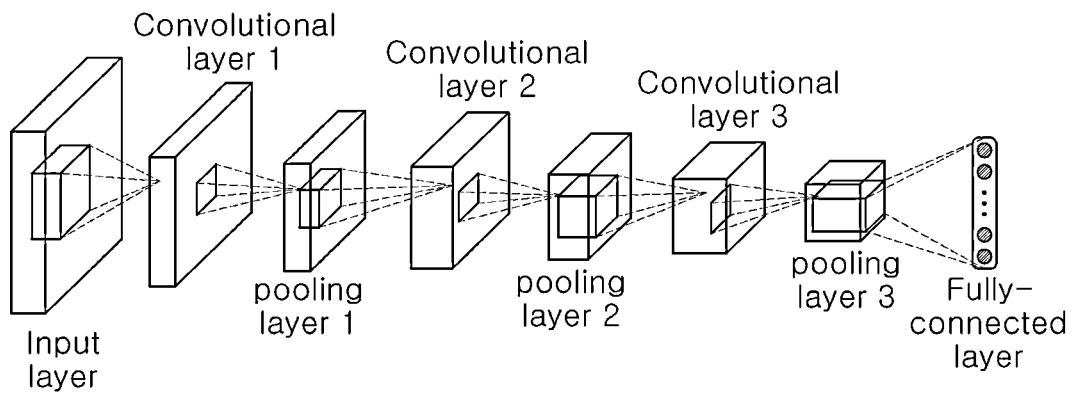
Figure 15:
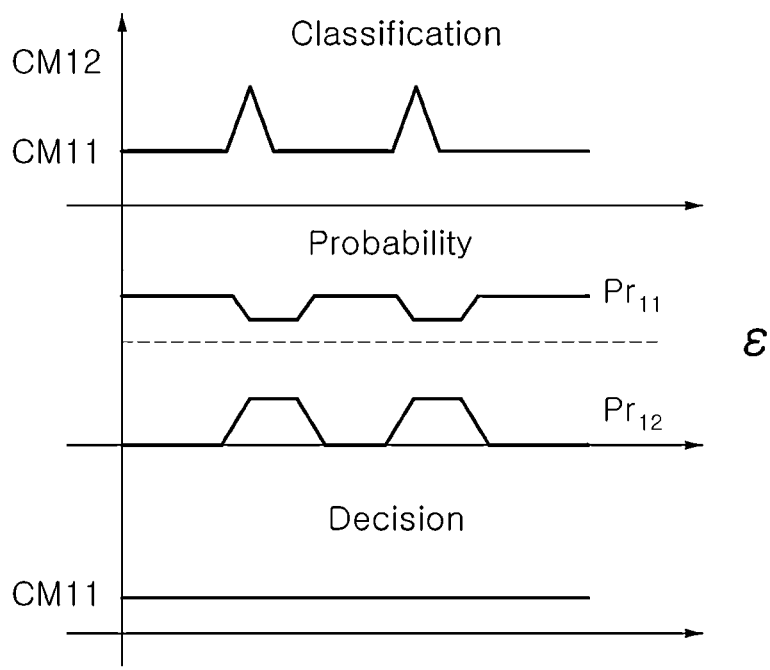
Figure 16:
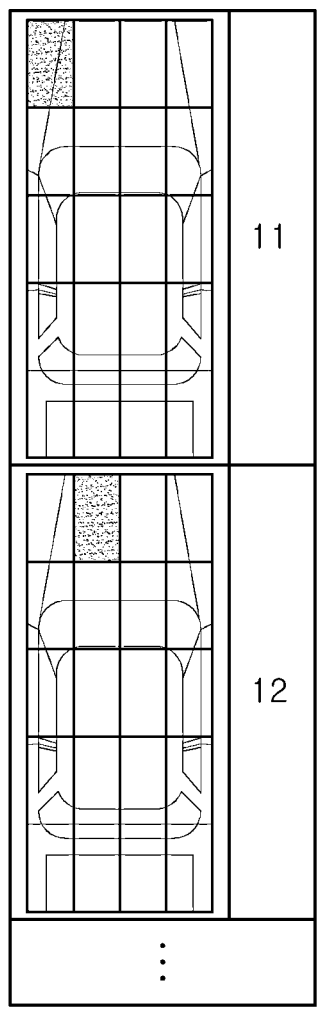

Hereinafter, a determination of the collision mode is described with reference to FIGS. 11 and 12. FIG. 11 is a view of defining the collision mode determined by the collision mode determination unit 124.

In other words, the left side of the drawing is a front side of a vehicle and the right side of the drawing is a rear side of the vehicle. In the drawing, the vehicle is divided into four zones in a vertical direction that are defined to have values of 1 through 4, and the vehicle is divided into five zones in a horizontal direction that are defined to have values of 1 through 5. All the zones are divided into fourteen collision modes by combining the values in the horizontal and vertical directions. The first digit of a number of each collision mode is the vertical zone division value and the second digit thereof is the horizontal zone division value.

Therefore, the collision modes may be exemplified as illustrated in FIG. 11. A white vehicle means an ego vehicle, and the rest of the surrounding objects mean vulnerable road users, such as a pedestrian, a bicycle, and an e-scooter. A collision mode 11, as illustrated, means that a pedestrian collides with the left front bumper of the ego vehicle.

The collision mode determination unit 124 determines a total of fifteen collision modes including, for example, fourteen collision sites and a safe case in which no collision occurs.

An entire system for determining the collision mode is described with reference to FIGS. 13-16 and the entire system includes three steps of pre-processing, classification, and post-processing. In the pre-processing step, the information integration unit 123 outputs the simplified bird's eye view on the basis of the surrounding object information detection unit 111, the lane detection unit 112, the risk level determination unit 121, and the surrounding environment prediction unit 122.

Next, features are extracted through a convolutional layer and a pooling layer. The collision mode is classified through a fully connected layer.

Further, in the post-processing, a double threshold setting method (Fang, Xiaowen, et al. "A Double-threshold-testing Robust Method for Fault Detection and Isolation in Dynamic Systems," proceedings of 1994 American Control Conference-ACC '94. Vol. 2. IEEE, 1994.) is applied to improve robustness. Since a classification result output from the CNN may instantaneously output a collision mode that is different from the actual collision mode, a probability of the classification result is calculated. Then, when the probability exceeds a threshold value E, a final collision mode determination result is output.

As described above, the method and apparatus for predicting a collision according to the present disclosure have been described. In FIG. 17, the method expressed sequentially is described again.

The surrounding object information detection unit 111 and the lane detection unit 112 respectively obtain surrounding object information and lane information through multiple sensors recognizing an external environment (S11). The obtained information is sensor-fused (S12) through the surrounding object information detection unit 111 to generate a fusion track.

Further, the risk level determination unit 121 uses information on a track corresponding to a surrounding object from the fusion track to perform computational processing of a risk level factor indicating a collision risk between an ego vehicle and the surrounding object (S13).

Further, it is determined whether the fusion track corresponding to the surrounding object is located within a set region of interest (S14). When the fusion track corresponding to the surrounding object is not located within the region of interest, the surrounding environment prediction unit 122, the information integration unit 123, and the collision mode determination unit 124 are not operated. Therefore, a position of the surrounding object is not predicted and the algorithm for generating the RGB simplified bird's eye view and determining the collision mode does not work.

As a result of determination in S14, when the surrounding object is located within the region of interest, the surrounding environment prediction unit 122 predicts state information such as a location of each object on the basis of the fusion track (S15).

Thereafter, the information integration unit 123 generates the RGB simplified bird's eye view using lane information, current state information on the fusion track, size and heading angle, past trajectory, risk level factor, and predicted position information on the object (S16).

Next, the generated simplified bird's eye view is input to the CNN-based collision mode determination unit 124 to classify the collision mode (S17). Thereafter, a probability of the collision mode classification result output through the double threshold setting method is calculated. Then, when the probability of the collision mode exceeds a preset threshold value, a final collision mode determination result is output (S18). A case that the fourteen collision sites illustrated in FIG. 11 are output as the determination results, which means that a collision will occur in the corresponding sites, and other than the sites, no collision will occur.

As described above, according to the present disclosure, not only the surrounding object but also the curvature of the lane is considered. The collision site of the ego vehicle is predicted by the simplified bird's eye view, thereby enabling vehicle control for safer driving.

Any one or more of the disclosed units may include or share a memory or storage and a processor. A memory may be included in a processor of any one or more of the units and/or may be provided separately. Accordingly, the memory may be configured as a combination of a hard disk drive, a flash memory, an electrically erasable programmable read-only memory (EEPROM), a static RAM (SRAM), a ferro-electric RAM (FRAM), a phase-change RAM (PRAM), a magnetic RAM (MRAM), a dynamic random access memory (DRAM), a synchronous dynamic random access memory (SDRAM), a double data rate-SDRAM (DDR-SDRAM), and/or the like.

In addition, a memory may store an algorithm used in a process in which the processor performs calculations. Any one or more of the units may include or share a computing system, which may include at least one processor, a memory, a user interface input device, a user interface output device, a storage, and a network interface. Any processor may be a central processing unit (CPU) or a semiconductor device that processes instructions stored in a memory and/or a storage. Each of the memory and the storage may include various types of volatile, transitory, non-transitory, or non-volatile storage media. For example, a memory may include a read-only memory (ROM) and a random access memory (RAM).

Accordingly, the operations of the methods or algorithms described in connection with the embodiments disclosed in the specification may be directly implemented with a hardware module, a software module, or a combination of a hardware module and a software module, which is executed by a processor. A software module may reside on a storage medium (i.e., a memory and/or a storage) such as a RAM, a flash memory, a ROM, an erasable and programmable ROM (EPROM), an EEPROM, a register, a hard disk drive, a removable disc, or a compact disc-ROM (CD-ROM).

A storage medium may be coupled to a processor. The processor may read out information from the storage medium and may write information into the storage medium. Alternatively, the storage medium may be integrated with the processor. The processor and storage medium may be implemented with an application specific integrated circuit (ASIC). The ASIC may be provided in a user terminal. Alternatively, the processor and storage medium may be implemented with separate components in the user terminal.

While embodiments of the present disclosure have been described with reference to the exemplified drawings, it should be apparent to those of ordinary skill in the art that the present disclosure is not limited to the aforementioned embodiments and may be variously changed and modified without departing from the spirit and the scope of the present disclosure. Accordingly, the changed or modified examples belong to the claims of the present disclosure and the scope of the present disclosure should be interpreted on the basis of the appended claims.

What is claimed is:

1. An apparatus for predicting a collision between a vehicle and a surrounding object around the vehicle, the apparatus being embedded in the vehicle and configured to predict a collision with an object moving around the vehicle while traveling, the apparatus comprising:
a surrounding object information detection unit configured to obtain current state information on the object by a sensor equipped on the vehicle;
a lane detection unit configured to obtain information on a lane on which the vehicle travels by a camera equipped on the vehicle;
a risk level determination unit configured to calculate a collision risk level between the object and the vehicle using state information on the object received from the surrounding object information detection unit;
a surrounding environment prediction unit configured to predict future state information on the object using an estimation algorithm or a deep learning algorithm;
an information integration unit configured to integrate the current state information, the lane information, the collision risk level, and the future state information to generate a simplified bird's eye view; and
a collision mode determination unit configured to predict collision modes through a convolutional neural network (CNN) using the simplified bird's eye view as an input.

2. The apparatus of claim 1, wherein the surrounding object information detection unit fuses information obtained from the sensor equipped on the vehicle to obtain the current state information on the object.

3. The apparatus of claim 2, wherein the risk level determination unit calculates the collision risk level when the object is located within a region of interest using the current state information on the object.

4. The apparatus of claim 1, wherein the information integration unit expresses the current state information on the object, the future state information on the object, the lane information, and the collision risk level as a combination of lines and polygons having a plurality of colors to generate the simplified bird's eye view.

5. The apparatus of claim 4, wherein the information integration unit expresses an actual past trajectory of the object and a future trajectory of the object on the basis of the present position of the object to generate the simplified bird's eye view.

6. The apparatus of claim 1, wherein the collision mode determination unit predicts the collision modes by learning virtual traveling data obtained by simulating a collision accident between the vehicle and the object in consideration of a motion type of the vehicle, a motion type of the object, and a road environment.

7. The apparatus of claim 6, wherein the virtual traveling data are data obtained by performing a simulation for each type of object.

8. The apparatus of claim 6, wherein the collision mode determination unit classifies the collision modes on the basis of whether a collision will occur between the vehicle and the object and on the basis of a collision site of the vehicle.

9. The apparatus of claim 8, wherein the collision mode determination unit calculates a probability of a result of classifying the collision modes, and outputs a final collision mode determination result when the calculated probability exceeds a threshold value.

10. A method of predicting a collision between a vehicle with a surrounding object moving around the vehicle while traveling, the method comprising:
   obtaining, by a surrounding object information detection unit, current state information on the object through a sensor equipped on the vehicle and obtaining, by a lane detection unit, information on a lane on which the vehicle travels;
   calculating, by a risk level determination unit, a collision risk level between the object and the vehicle by using state information on the object;
   predicting, by a surrounding environment prediction unit, future state information on the object by using an estimation algorithm or a deep learning algorithm;
   generating, by an information integration unit, a simplified bird's eye view by integrating the current state information, the lane information, the collision risk level, and the future state information;
   predicting collision modes through a convolutional neural network (CNN) using the simplified bird's eye view as an input; and
   calculating a probability of a result of classifying the collision modes and outputting a final collision mode determination result when the calculated probability exceeds a threshold value,
   wherein the predicting of the collision modes includes
      extracting a collision prediction feature through a convolutional layer and a pooling layer, and
      classifying the collision modes through a fully connected layer.

11. The method of claim 10, further comprising fusing information obtained from multiple sensors equipped on the vehicle before calculating the collision risk level.

12. The method of claim 11, further comprising:
   determining whether the object is located within a region of interest using the current state information after calculating the collision risk level,
   wherein the predicting of the future state information is performed when the object is located within the region of interest.

13. The method of claim 10, wherein generating the simplified bird's eye view comprises expressing the current state information, the future state information, the lane information, and the collision risk level as a combination of lines and polygons having a plurality of colors.

14. The method of claim 13, wherein generating the simplified bird's eye view comprises expressing a past trajectory of the object and a future trajectory of the object on the basis of the present position of the object.

15. The method of claim 10, wherein predicting the collision modes comprises predicting the collision modes by learning virtual traveling data obtained by simulating a collision accident between the vehicle and the object in consideration of a motion type of the vehicle, a motion type of the object, and a road environment.

16. The method of claim 15, wherein the virtual traveling data are data obtained by performing a simulation for each type of object.

17. The method of claim 15, wherein predicting the collision modes comprises classifying the collision modes on the basis of whether a collision will occur between the vehicle and the object and on the basis of a collision site of the vehicle.

* * * * *